Figure 1:
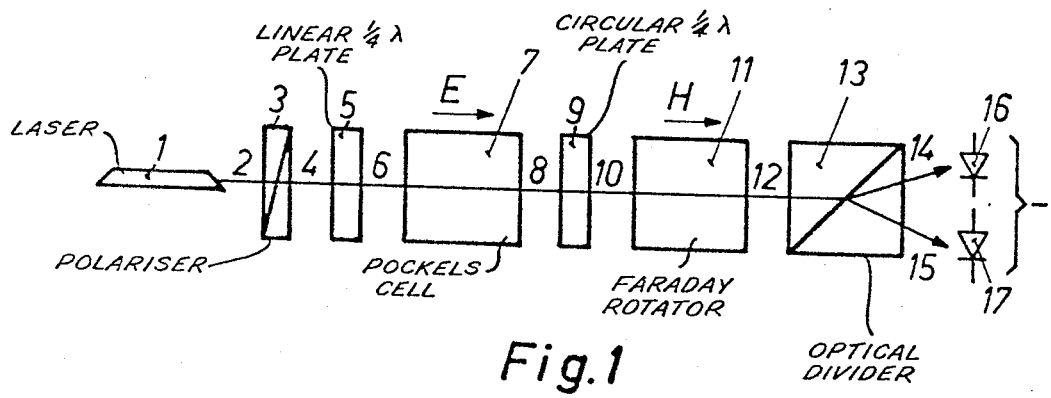

United States Patent
Jaecklin

[15] 3,675,125
[45] July 4, 1972

[54] OPTICAL WATTMETER

[72] Inventor: Andre Jaecklin, Ennetbaden, Switzerland

[73] Assignee: Aktiengesellschaft Brown, Boveri & Cie, Baden, Switzerland

[22] Filed: Dec. 1, 1970

[21] Appl. No.: 94,027

[30] Foreign Application Priority Data

Dec. 10, 1969  Switzerland ..................18403/69

[52] U.S. Cl..................................324/96, 250/225, 324/142
[51] Int. Cl..................G01r 31/00, G01r 7/00, G01r 21/00
[58] Field of Search ........................................324/96, 97, 142

[56] References Cited

UNITED STATES PATENTS

3,466,541  9/1969  Bernard et al. .........................324/96

*Primary Examiner*—Alfred E. Smith
*Attorney*—Pierce, Scheffler & Parker

[57] ABSTRACT

An optical wattmeter for measuring the magnitude of the instantaneous power being transmitted over a high voltage line utilizes a monochromatic circularly polarized light beam which is transmitted through an electro-optical modulator such as $K_{err}$ or Pockels cell subjected to an electric field produced by the high voltage line proportional to the voltage component of the power to be measured. The light beam, doubly refracted in the modulator thereby to produce an elliptically polarized beam, the eccentricity of the ellipse being variable with the line voltage, is passed through a circular quarter-wave plate and then delivered to a Faraday rotator which is subjected to a magnetic field produced by the high voltage line proportional to the current component of the power to be measured. The magnetic field produces a phase shift proportional to the magnetic field between the laevo-rotatory and dextro-rotatory components of the light beam which results in a change of inclination proportional to the magnetic field of the ellipse of the outcoming elliptically polarized beam. The elliptically polarized light beam emerging from the Faraday rotator thus containing data relative to the strength of the electric field as a function of the eccentricity of the ellipse and data relative to the strength of the magnetic field as a function of its inclination is then passed through a polarization type beam splitter such as a Wollaston prism which divides the light beam into two partial beams having different polarization directions, these partial beams then being passed respectively to photo-electric detectors which produce electrical intensities and which are then electrically substrated to produce an output current proportional to the product of the voltage on, and current flow in, the high voltage line at the point at which the instantaneous power level is measured.

9 Claims, 4 Drawing Figures

Inventor
André Jaecklin

By Pierce, Schiffler & Parker
Attorneys

OPTICAL WATTMETER

This invention relates to an improved system for a potential-free measurement of electrical power, that is to say a "non-live" power transformer or an "optical" wattmeter. In this context, "non-live" refers to the measurement of an electrical quantity without any physical electrical connection to the apparatus yielding the quantity.

It is known, for example Swiss Pat. Specification No. 433,065, to measure electric currents in a non-live manner on high-voltage lines by utilizing the current to be measured for the electro-mechanical intensity modulation of a light beam which is then transmitted in a non-live manner through optical fibers to the measuring station whereupon, and after conversion of the light intensity into electric currents, the data relating to the current to be measured is obtained by demodulation.

It is also known (Rev. gen. de l'Electricite 1967, p.1,045 et seq.) to measure electric currents in non-live manner by modulating a light beam relative to its polarization direction by means of a magneto-optical element, a Faraday rotator, disposed in the magnetic field of the current to be measured, and data relating to be measured is obtained by conversion of the polarization-modulation into intensity fluctuations and the electrical measurement thereof.

It is also known (Technische Rundschau No. 43, Oct. 10, 1969, part 8), to modulate monochromatic, coherent light beams by means of linear, electro-optical crystals of the ADP or the ferro-electrical pervoskite group, so-called Pockels cells, which are disposed in an electrical field. The ADP crystal group includes ammonium-dihydrogen-phosphate, potassium-dihydrogen phosphate and potassium-dideuterium-phosphate.

Non-live power transducers by means of which the electrical power N can be represented as the product of the electric field E of voltage U and of the magnetic field H of current I, without any electrical connection between the measuring and indicating location are however not yet known.

The present invention provides a non-live power transducer of the kind heretofore described which is of particular technological and economical significance for super-voltage powers the electrical transmission of which is subject to insulation difficulties.

The power transducer according to the invention is characterized in that an electro-optical modulator such as a Kerr or Pockels cell disposed in the electric field which is proportional to the power to be measured and a Faraday rotator disposed in the magnetic field which is proportional to the power to be measured are disposed in the optical path of a monochromatic polarized light beam followed by a polarization divider adapted to split the received light beam into two polarization directions, each of which is then followed by a photo-electric element for converting the light intensities of the two part beams into electrical currents and finally being followed by an electrical system for forming the difference of the two photo-electric currents thus obtained.

According to an advantageous embodiment of the invention, coherent linearly polarized light is employed and, prior to entry into the Pockels modulator, is subjected to circular polarization by means of a linear quarter-wave plate, for example of mica, disposed in the diagonal position. The linear polarization of the incident light beam can be produced by a separate polarizer but in appropriate cases and when using certain types of lasers as a coherent light source, the linear polarization of the light emitted thereby will be sufficient.

According to a further advantageous embodiment of the invention and if the Faraday rotator is disposed downstream of the Pockels modulator, a circular quarter-wave plate producing a phase shift of $\pi/2$ between the laevo-rotatory and the dextro-rotatory light components and being constructed for example of quartz, is disposed between the aforementioned two elements.

Furthermore, a Wollaston prism or a Banning polarizing divider is appropriately employed for splitting the light beam into two polarization directions after the emergence of said light beam from the Faraday rotator. These sets of optical apparatus split the incident light beam into two partial light beams, the linear polarization of which is perpendicular to each other.

If the two partial light beams are converted by means of photoelectric elements, for example photo diodes, into electrical currents which are proportional to the intensity of the light beams, and if the difference of said currents is then formed by electrical means, the differential current $I_D$ will be expressed by:

$$I_D = \sin 2\delta \cdot \sin 2\theta \quad (1)$$

where
$\delta = k \cdot U$ and
$\theta = c \cdot I$, and $k$ and $c$ are constants.

If the values are sufficiently small ($2kU \ll 1; 2cI \ll 1$) the sinusoidal functions will be equal to their arguments. In this case Equation (1) will become $$I_D \approx 2\delta \cdot 2\theta = 4 k \cdot c \ UI = K \cdot N \quad (2)$$

where $N$ is the electrical power to be measured and $K = 4 \cdot k \cdot c$. With the exception of a constant $K$ which can be defined by calibration, the current at the output of the system will then be directly proportional to the product of current and voltage at the location at which the electrical power is to be measured and will therefore be directly proportional to the (instantaneous) electrical power itself.

The system according to the invention measures the active power. In a further embodiment of the invention the reactive power could be defined if measured values of the current and voltage amplitudes are separately derived from the Pockels cell and the Faraday rotator whereupon the power factor is defined as the quotient of the active power and the product of current and voltage amplitude, for example by means of electrical multiplication and division respectively.

If a system is selected in which the linear and/or circular quarter-wave plate is omitted, Equation (1) will not yield the sinusoidal function but rather a cosine function which does not lead to Equation (2) and is therefore correspondingly more difficult to evaluate.

A Kerr cell may be employed instead of a Pockels cell. Suitable materials for electro-optical modulators comprise $LiNbO_3$, KDP and the like. Flint glass is preferably employed for the Faraday rotator. It is however appropriate in all cases for the light beam traversing the modulator to be guided substantially in parallel to the field which acts modulating.

Figure 2:
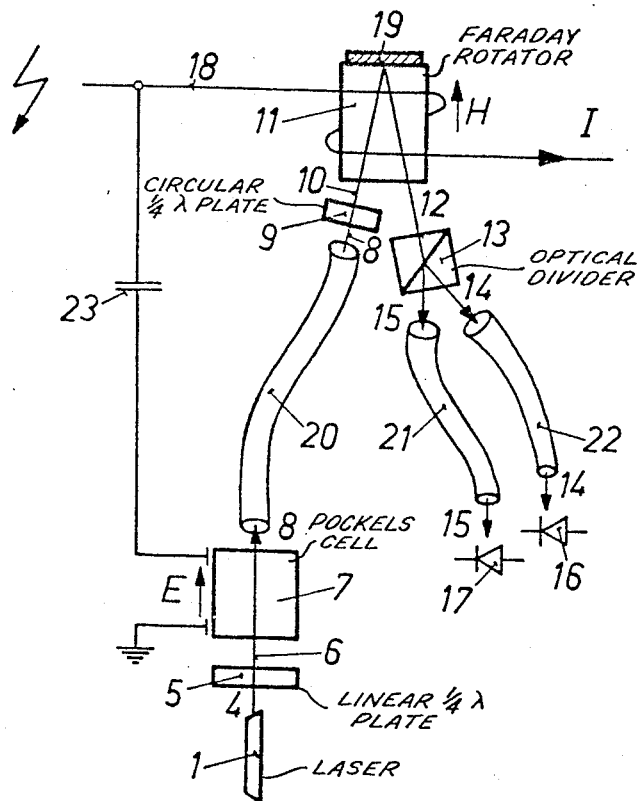
Figure 3:
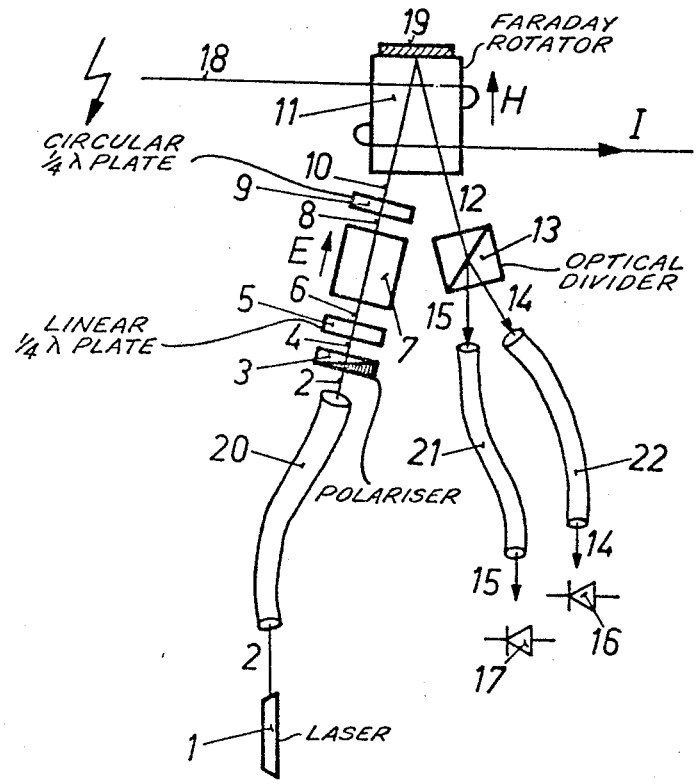
Figure 4:
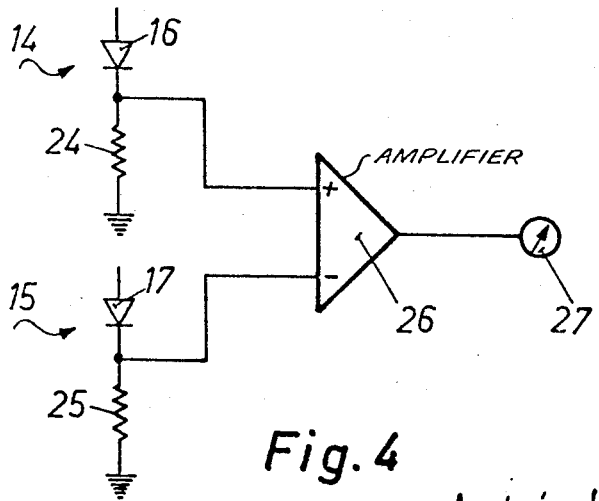

The invention will be explained hereinbelow by reference to two embodiments illustrated in drawings in which FIG. 1 shows in diagrammatic form the arrangement of the individual elements in the optical path of the light beam, FIG. 2 shows a measuring system for a high-voltage transmission line to which the Pockels cell is capacitatively coupled, FIG. 3 shows a measuring system in which the Pockels cell is directly disposed in the electrical field which is proportional to the power to be measured, and FIG. 4 shows in diagrammatic form the electronic system employed for evaluation.

In the exemplified embodiments the source of the light beam for transmitting data is a laser 1 which, as is known, produces monochromatic, coherent light in many cases of linear polarization. The light beam emerging from the laser 1 is designated with the numeral 2.

The light beam 2 enters into a polarizer 3 which defines the oscillation orientation of the emergent light beam 4.

The light beam 4 then enters into a linear quarter-wave plate 5. This plate may for example comprise mica, cut in parallel to the optical axis and being disposed in the diagonal position perpendicularly to the incident light beam 4. The quarter-wave plate 5 produces a phase shift of $\pi/2$ between the two polarization orientations of the emergent light beam 6 to produce light of circular polarization.

The circularly polarized beam 6 then enters the Pockels cell 7. This may for example comprise a potassium hydrogen phosphate (KDP) crystal whose (001) axis is orientated in parallel to the electrical field E and to the light beam 6. The electric field E, which is proportional to the electric power N to be measured, produces a double refraction in the Pockels crystal so that its refractive properties could be described by a refractive index ellipsoid. The principal axes of that ellipsoid are appropriately disposed in parallel to the principal axes of the preceding quarter-wave plate 5.

A phase shift $2\delta$ between the two principal axes of the corresponding oscillations of the emergent light beam 8, results from the double refraction, which is proportional to the electrical field E. The circularly polarized light beam 6 will then be elliptically polarized in the form of the emergent light beam 8.

Preferably the light beam 8 then traverses through a circular quarter-wave plate 9 so that — assuming the two linear oscillations to be split in each case into a laevo-rotatory and a dextro-rotatory component of circular polarization — a phase shift by $\pi/2$ occurs between the said components in the light beam 10 downstream of the quarter-wave plate 9 before the said light beam enters the Faraday rotator 11, e.g. a yttrium-iron-garnet.

The Faraday rotator 11 is disposed in the magnetic field H which is proportional to the electrical power N to be measured. The light beam is appropriately guided substantially parallel to the magnetic field H which acts modulating.

Due to the action of the magnetic field H, the Faraday rotator is rendered optically active, that is to say it produces a phase shift $2\theta$, proportional to the magnetic field, between the laevo-rotatory and dextro-rotatory components of the light beam. This results in a change of inclination, proportional to the magnetic field, of the two linear oscillations along the principal axes of the quarter-wave plate 5 of the light beam 10.

The light beam 12 is still elliptically polarized, the eccentricity of the ellipse containing data relating to the electric field while the inclination thereof contains data of the magnetic field.

The light beam 12 is then transferred to an optical divider system 13 adapted to split the light beam into the two partial beams 14, 15 whose polarization is perpendicular relative to each other. A Wollaston prism or a Banning polarizing beam splitter may be employed for such an optical splitting system. The beam splitting apparatus 13 is appropriately so orientated that one of the oscillation directions of the part beams 14, 15 is disposed in parallel to the oscillation direction of the light beam 4 prior to the entry thereof into the linear quarter-wave plate 5.

The partial beams 14 and 15 are then transferred to two photoelectric detectors 16,17, for example germanium photo diodes. Electric currents, proportional to the light intensities of the partial beams 14,15, that is to say being proportional to the square of their amplitudes, may thus be derived from the photoelectric elements. The resultant currents are then electrically subtracted from each other to produce a current $I_D$ which represents the value in Equations (1) or (2) respectively.

Practical embodiments of the fundamental system according to FIG. 1 are illustrated in FIGS. 2 and 3.

In FIG. 2 the Pockels cell 7 is connected via a capacitive voltage divider 23 to a high-vOltage transmission line 18. Accordingly, the Pockels cell 7 may be optionally connected to earth potential or high voltage potential. Earthing of the Pockels crystal 7 at one end, and connection of the other end to the capacitance 23 produces the electric field E which causes birefringence in the crystal.

The Faraday crystal 11 is then disposed in one loop of the high voltage transmission line 18. The Faraday crystal 11 is thus subjected to the magnetic field H, produced by the line current I and resulting in the optical activity.

In all other respects the measuring system corresponds substantially to the kind described hereinabove, flexible optical fibers 20, 21 and 22 being merely additionally provided, and by means of which the light beams 8 or 14, 15 respectively can be transmitted to the appropriate elements 10 or 16, 17 respectively. A mirror 19 is also provided on one endface of the Faraday crystal 11 to reflect the incident light beam 10. The polarizer 3 is omitted in the illustrated example, that is to say the system is based on the oscillation orientation of the linearly polarized light as defined by the laser 1.

The embodiment illustrated in FIG. 3 differs from that illustrated in FIG. 2 by virtue of the fact, that as described above a polarizer 3 is employed to define the oscillation orientation of the linearly polarized light and in particular the Pockels crystal 7 is disposed in a non-live manner in the electrostatic field of the high voltage transmission line 18. The capacitive coupling 23 in accordance with FIG. 2 is therefore omitted.

FIG. 4 finally discloses the fundamental form of the electronic evaluation system. Photo-electric elements 16,17 on which the partial beams 14, 15 are incident, are shown in this illustration as in the preceding ones. Electric currents which are proportional to the light intensities of the partial beams 14 and 15 may be derived from the resistors 24 and 25. These currents are applied to a differential amplifier 26 the output of which produces a differential current $I_D$ which is measured by means of a measuring system 27 shown in diagrammatic form. As disclosed hereinabove, the measured current $I_D$ is directly proportional to the electric power transmitted in the transmission line 18.

I claim:

1. In an optical wattmeter for measuring the magnitude of the instantaneous power being transmitted over a high voltage line, the combination comprising means including a light source for producing a monochromatic circularly polarized light beam, an electro-optical modulator such as a Kerr or Pockels cell through which said light beam is passed, means subjecting said modulator to an electric field produced by the high voltage line proportional to the voltage component of the power to be measured, said light beam being doubly-refracted in said modulator thereby to produce an elliptically polarized light beam the eccentricity of which varies with the line voltage, a Faraday rotator through which said elliptically polarized light beam is passed, means subjecting said Faraday rotator to a magnetic field proportional to the current component of the power to be measured thus resulting in a change in the inclination of the outgoing elliptically polarized light beam which is proportional to said magnetic field, said elliptically polarized light beam of variable inclination thus containing data relative to the strength of said electric field as a function of the eccentricity of the ellipse and also data relative to the strength of said magnetic field as a function of its inclination, a beam splitter through which the elliptically polarized variably inclined light beam emerging from said Faraday rotator is passed and which serves to divide said beam into two partial beams having different polarization directions, photoelectric detectors receiving respectively said partial beams and conveting them into corresponding electrical currents, and means electrically subtracting said currents to produce an output current proportional to the product of the voltage on the line and the current flow therethrough at the point at which the power level is measured.

2. An optical wattmeter as defined in claim 1 wherein said electro-optical modulator is located within the electric field produced by said high voltage line.

3. An optical wattmeter as defined in claim 1 wherein said electro-optical modulator is connected to said high voltage line through a capacitance voltage divider.

4. An optical wattmeter as defined in claim 1 wherein said light source thereof produces coherent light.

5. An optical wattmeter as defined in claim 1 wherein said beam splitter is constituted by a Wollaston prism.

6. An optical wattmeter as defined in claim 1 wherein said beam splitter is of the Banning type.

7. An optical wattmeter as defined in claim 1 wherein said Pockels cell incorporates a KDP crystal.

8. An optical wattmeter as defined in claim 1 wherein said Faraday rotator incorporates a yttrium-iron-garnet.

9. An optical wattmeter as defined in claim 1 wherein said means for producing said circularly polarized light beam includes a linear quarter-wave plate through which the light is passed prior to entering said electro-optical modulator, said linear quarter-wave plate being disposed diagonally to the oscillation orientation of the incident light, and which further includes a circular quarter-wave plate through which said elliptically polarized light beam is passed prior to entering said Faraday rotator and which serves to effect a phase shift of $\pi/2$ between the laevo-rotatory and dextro-rotatory components of the beam.

* * * * *